Figure 1:
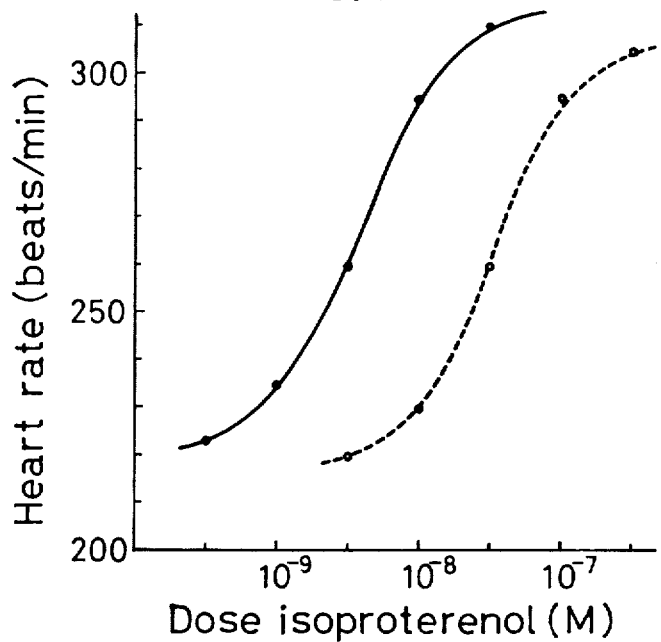

United States Patent [19]
Kasuya et al.

[11] 3,876,653
[45] Apr. 8, 1975

[54] BENZOTHIAZOLE DERIVATIVES

[75] Inventors: Yutaka Kasuya, Kawasaki; Hiroyuki Obase, Osaka, both of Japan

[73] Assignee: Kyowa Hakko Kogyo Co., Ltd., Tokyo, Japan

[22] Filed: Apr. 12, 1973

[21] Appl. No.: 350,480

Related U.S. Application Data

[63] Continuation-in-part of Ser. No. 345,108, March 26, 1973, abandoned.

[52] U.S. Cl. ............... 260/304; 424/200; 424/232; 424/270
[51] Int. Cl. ........................................... C07d 91/44
[58] Field of Search ................................... 260/304

[56] References Cited
UNITED STATES PATENTS
3,328,417 6/1967 McLoughlin et al. ............ 260/304

OTHER PUBLICATIONS

Wagner et al., *Synthetic Organic Chemistry*, N.Y., John Wiley & Sons, 1953, pp. 226–228 & 660–665.

*Primary Examiner*—Richard J. Gallagher
*Attorney, Agent, or Firm*—Fitzpatrick, Cella, Harper & Scinto

[57] ABSTRACT

New benzothiazole derivatives and the salts thereof have excellent β-adrenergic receptor blocking activity and anti-arrhythmic effects. A process for producing the benzothiazole derivatives and their salts is also described.

7 Claims, 4 Drawing Figures

BENZOTHIAZOLE DERIVATIVES

This application is a continuation-in-part of U.S. application Ser. No. 345,108, filed Mar. 26, 1973, and now abandoned.

This invention relates to new benzothiazole derivatives and the salts thereof and to methods for preparing same. The benzothiazole derivatives and their salts show strong pharmacological activity, especially β-adrenergic receptor blocking activity and, therefore, are useful in the treatment or prevention of nervous disorders.

The benzothiazole derivatives which are the subject of the present invention are new compounds and are represented by the formula

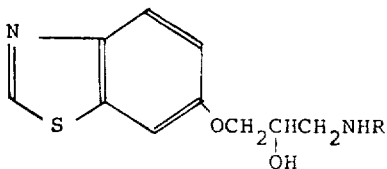

wherein R represents a hydrocarbon group having 1 to 10 carbon atoms such as an alkyl group having 1 to 5 carbon atoms, such as a methyl, ethyl, propyl, isopropyl, butyl, sec-butyl, isobutyl, n-amyl or isoamyl group, an aralkyl group having 7 to 10 carbon atoms, such as a benzyl group or 1-methyl-3-phenylpropyl group, or an aryl group having 6 to 10 carbon atoms, such as a phenyl group or naphthyl group.

The benzothiazole derivatives may also be employed in the form of a salt. Suitable salts are the acid addition salts such as, for example, the salts of inorganic acids such as the hydrochloride, hydrobromide, phosphate, sulfate and nitrate and the organic acid salts, particularly aliphatic and aromatic carboxylic acid salts including oxycarboxylic acid salts and especially mono-, di-, and tricarboxylic acid salts, preferably $C_2$–$C_{10}$ aliphatic carboxylic acid salts and $C_7$–$C_{11}$ aromatic carboxylic acid salts, such as the oxalate, lactate, tartrate, acetate, propionate, salicylate, citrate, maleate, adipate, naphthoate, succinate and benzoate.

In accordance with the present invention, a process for the preparation of the desired benzothiazole derivative is also provided. The desired compounds may be prepared by reacting a compound represented by the formula

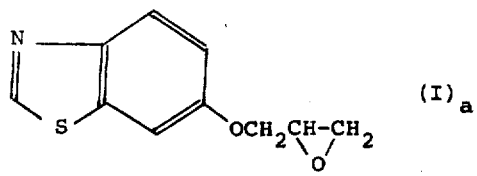

or

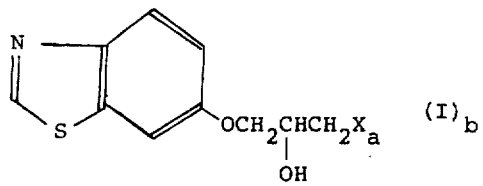

wherein $X_a$ represents a halogen atom such as chlorine, bromine or iodine, or a leaving group such as

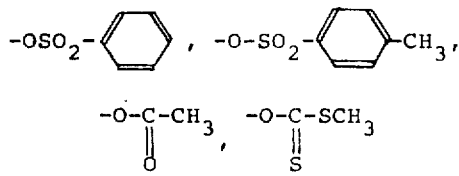

and the like with an amine represented by the formula $NH_2R$ wherein R has the same significance as defined above. Examples of suitable amines are methylamine, ethylamine, propylamine, isopropylamine, butylamine, isobutylamine, benzylamine, β-phenylethylamine and 1-methyl-3-phenylpropylamine. The amount of an amine employed in the reaction is preferably ten-fold excess.

The reaction may be carried out at a temperature of 50° to 120°C, preferably 60° to 80°C for 2 to 6 hours. The reaction can be carried out in the presence or absence of a solvent. Where a solvent is employed, organic solvents such as benzene, toluene, ethanol, chloroform, and the like may be employed. In general, any solvent that does not participate in the reaction may be employed. Where the reaction is carried out in the absence of a solvent, the reactants are heated at a temperature between 50° and 120°C. The dry reaction is preferably carried out in an autoclave with heating. After the reaction, the solvent and excessive amine are removed by distillation. The desired product can be obtained by extraction of the residue with a suitable solvent, for example, ethyl acetate. The compound of the formula $(I)_a$ used as the starting material may be prepared by reacting 6-hydroxybenzothiazole with epichlorohydrin in the presence of alkali. The starting material of the formula $(I)_b$ may be prepared by cleaving the epoxy ring of the compound of the formula $(I)_a$.

For example, the epoxy compound $(I)_a$ is heated with 1N-HCl and the mixture is poured into a large amount of water. The liberated oil is extracted with ether. Distilling off the ether from the extract, a compound $(I)_b$ where $X_a$ is Cl is obtained. Where a compound $(I)_b$ where

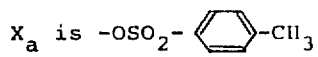

is desired, an alcoholic solution of the compound $(I)_a$ is heated with an aqueous solution of p-toluene sulfonic acid on water bath for 2 to 3 hours and the resulted mixture is treated as above.

The desired benzothiazole derivatives can also be prepared by reacting 6-hydroxybenzothiazole with a compound represented by the formula

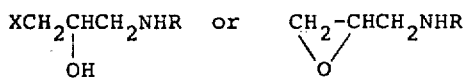

wherein R is a hydrocarbon group having 1 to 10 carbon atoms, preferably an alkyl group having 1 to 5 carbon atoms and X is a halogen atom, at 50° to 120°C preferably 60° to 80°C for 2 to 6 hours using a suitable solvent, such as methanol, ethanol, propanol, benzene, toluene, chloroform, dioxane, etc. After distillation, the product can be obtained from the residue by extraction.

The benzothiazole derivatives can further be prepared by hydrogenolyzing a compound represented by the formula

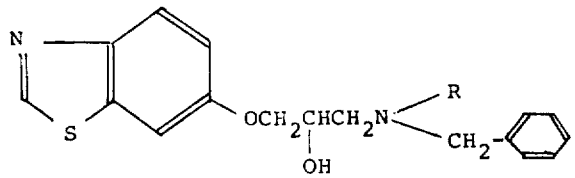

wherein R has the same significance as defined above, in the presence of a reducing catalyst such as palladium carbon, platinum, nickel, nickel alloy, etc. in a suitable solvent. The reaction can be carried out at a temperature of 20° to 125°C, preferably 50° to 70°C under atmospheric pressure or under applied pressure. Any solvent usually used in catalytic reduction reactions such as methanol, ethanol, propanol, benzene, toluene, chloroform, dioxane, etc. can be employed. The reaction is generally carried out until the theoretical amount of hydrogen has been absorbed.

The raw material compound of the formula (II) may be prepared by reacting the compound of the formula (I)$_a$ or (I)$_b$ with a benzylamine represented by the formula

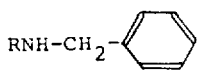

wherein R has the same significance as defined above, at 50° to 120°C for 2 to 6 hours using a suitable solvent.

Alternatively, the benzothiazole derivatives can be prepared by reacting a compound represented by the formula

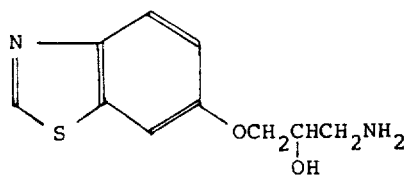

together with an alkanal or alkanone having 1 to 10 carbon atoms under reduction conditions. Alkanals such as formaldehyde, acetaldehyde, propionaldehyde, butyraldehyde, isobutyraldehyde, n-amylaldehyde and isoamylaldehyde may be employed. Alkanones such as acetone, methyl ethyl ketone, methyl n-propyl ketone and diethyl ketone may be employed.

The reaction can be carried out under atmospheric pressure or under applied pressure with heating and stirring in the presence of hydrogen and a suitable catalyst. Alternatively, the reaction can be carried out in the presence of such reducing agents as lithium aluminum hydride, sodium borohydride, potassium borohydride, and the like. Catalysts generally employed in hydrogenation reactions such as, for example, platinum, palladium carbon and Raney nickel may be employed. The reaction is generally carried out in an inert diluent or solvent such as methanol, ethanol, isopropyl alcohol, dioxane and the like. Generally, the reaction is allowed to proceed until the theoretical amount of hydrogen is absorbed. The reaction is carried out at a temperature between 20° and 125°C, preferably 50° and 70°C.

The salts of the benzothiazole derivatives of the present invention may be prepared by the usual techniques used to prepare acid addition salts of amines. Where the starting compound is already in the form of an acid addition salt, the desired product may be obtained in the form of the corresponding acid salt.

The benzothiazole derivatives and their salts may be incorporated by conventional means into tablets, capsules, suspensions, emulsions, solutions or dispersible powders for administration purposes.

The benzothiazole derivatives and their salts may be administered in a dosage from about 0.02 to 1 mg/kg body weight per day, which may be provided in 2 to 4 separate doses at appropriate interval.

The drawings attached hereto show chronotropic and isotropic dose-response curves.

Now, the present invention will be further explained, referring to the following examples, but these examples are merely illustrative and do not restrict the scope of the present invention.

EXAMPLE 1

A mixture of 40 g of 6-hydroxybenzothiazole, 85 g of epichlorohydrin, 55.1 g of potassium carbonate and 800 ml of acetone is refluxed for 10 hours on a water bath.

After cooling, the mixture is subjected to filtration and the filtrate is concentrated. 100 ml of toluene is added to the concentrate and the mixture is concentrated again. Such a procedure of the addition of toluene and concentration of the mixture is repeated for three times to completely remove the unreacted epichlorohydrine.

As the result, 52.3 g of 3-(6-benzothiazolyloxy)-1,2-epoxypropane is obtained as an oily product. This oily product is dissolved in 600 ml of ethanol and the solution is refluxed together with 160 g of isopropylamine for 3 hours.

After the reaction, ethanol and isopropylamine are removed by distillation and the residual oily product is dissolved in 300 ml of 3N hydrochloric acid. The resultant acidic solution is washed twice with each 100 ml of ether and then adjusted to a pH of 10 with 3N aqueous solution of sodium hydroxide. The liberated oily product is extracted three times with each 100 ml of ethyl acetate. The ethyl acetate extract is dried with sodium sulfate. After ethyl acetate is removed by distillation, 55 g of solid is obtained. Upon recrystallization of the solid from 3l of ligroin, 43 g of 1-(6-benzothiazolyloxy)-3-isopropylamino-2-propanol is obtained. This substance has a melting point of 97° to 98°C. 15 g of this substance is dissolved in 200 ml of ethanol. Upon adding 6N hydrochloric acid solution in ethanol to the resultant solution, the hydrochloride of the desired 1-(6-benzothiazolyloxy)-3-isopropylamino-2-propanol is separated out. Upon recrystallization of 18 g of the crude product from a solvent mixture of 700 ml of isopropylalcohol and 600 ml of ethanol, 11 g of white needle crystals is obtained.

Melting point: 132°–134°C

Elementary analysis as $C_{13}H_{18}N_2O_2S \cdot HCl \cdot 3H_2O$:

Calculated: C=43.75 percent, H=7.06 percent, N=7.85 percent, S=8.98 percent.

Found: C=43.68 percent, H=6.87 percent, N=7.90 percent, S=9.02 percent.

EXAMPLE 2

3-(6-benzothiazolyloxy)-1,2-epoxypropane obtained in Example 1 is reacted with aniline under the same conditions as described in Example 1. After the reaction, 1-(6-benzothiazolyloxy)-3-anilino-2-propanol hydrochloride is obtained by carrying out the same purification procedure as described in Example 1.

Elementary analysis as $C_{16}H_{16}O_2N_2S.HCl.H_2O$

Calculated: C=54.16 percent, H=5.40 percent, N=7.89 percent, S=9.03 percent.

Found: C=54.27 percent, H=5.36 percent, N=7.65 percent, S=9.01 percent.

EXAMPLE 3

30 g of 3-(6-benzothiazolyloxy)-1,2-epoxypropane obtained in Example 1 is dissolved in 450 ml of ethanol. 250 g of isopropylbenzylamine is added to the resultant solution and the mixed solution is refluxed for 3 hours on a water bath.

After the reaction, ethanol and isopropylbenzylamine are removed by distillation and the residual oily product is dissolved in 200 ml of 3N hydrochloric acid. The acidic solution is extracted twice with each 100 ml of ether and adjusted to a pH of 10 with 3N aqueous solution of sodium hydroxide. The liberated oily substance is extracted three times with each 100 ml of ethyl acetate. The ethyl acetate extract is dried with sodium sulfate and the ethyl acetate is removed by distillation. The resultant oily product is dissolved in 100 ml of ethanol. 6N hydrochloric acid solution in ethanol is added to the solution until white crystals cease to separate out of the solution. Thus, crystalline 1-(6-benzothiazolyloxy)-3-isopropylbenzylamino-2-propanol hydrochloride is obtained. 35 g of the crystals is dissolved in 1 l of methanol. 5 g of palladium carbon is added to the solution and the mixture is hydrogenated with vigorous stirring at 40°C for 5 hours. The catalyst is then removed by filtration and the filtrate is concentrated. 29.5 g of crude 1-(6-benzothiazolyloxy)-3-isopropylamino-2-propanol hydrochloride is obtained. Upon recrystallization of the crude product from a solvent mixture of 1.1 l of isopropylalcohol and 0.9 l of ethanol, 18.5 g of white needle crystals are obtained.

Melting point: 132°–134°C

Elementary analysis as $C_{13}H_{18}N_2O_2S.HCl.3H_2O$:

Calculated: C=43.75 percent, H=7.06 percent, N=7.85 percent, S=8.98 percent.

Found: C=43.65 percent, H=7.03 percent, N=7.94 percent, S=8.71 percent.

EXAMPLE 4

30 g of 3-(6-benzothiazolyloxy)-1,2-epoxypropane obtained in Example 1 is reacted with N-benzylaniline under the same conditions as described in Example 3.

After the reaction, 1-(6-benzothiazolyloxy)-3-benzylanilino-2-propanol hydrochloride is obtained by carrying out the same purification procedure as described in Example 3. 40 g of this substance is dissolved in 1.2 l of methanol. 5 g of palladium carbon is added to the solution and the mixture is hydrogenated with vigorous stirring at 45°C for 6 hours. After the absorption of hydrogen is complete, catalyst is removed by filtration and the filtrate is concentrated. 30.1 g of crude 1-(6-benzothiazolyloxy)-3-anilino-2-propanol hydrochloride is obtained. Upon recrystallization of the crude product from a solvent mixture of 1.2 l of isopropanol and 1.1 l of ethanol, 19.3 g of white needle crystals are obtained.

Elementary analysis as $C_{16}H_{16}O_2N_2S.HCl.H_2O$:

Calculated: C=54.16 percent, H=5.40 percent, N=7.89 percent, S=9.03 percent.

Found: C=54.13 percent, H=5.28 percent, N=7.95 percent, S=8.87 percent.

EXAMPLE 5

A mixture of 20 g of 6-hydroxybenzothiazole, 15.6 g of 1-chloro-3-isopropylamino-2-propanol, 25 g of potassium carbonate and 300 ml of acetone is refluxed at 65°C for 20 hours on a water bath.

After the reaction, potassium carbonate is removed by filtration and acetone is distilled off. The residue is dissolved in 300 ml of 3N hydrochloric acid. The resultant solution is washed three times with each 100 ml of ether and then adjusted to a pH of 10 with 3N aqueous solution of sodium hydroxide. The liberated oily product is extracted three times with each 100 ml of ethyl acetate. The ethyl acetate extract is dried with sodium sulfate. After ethyl acetate is removed by distillation, 9 g of solid is obtained. Upon recrystallization of the solid from 300 ml of ligroin, 8 g of 1-(6-benzothiazolyloxy)-3-isopropylamino-2-propanol is obtained.

Melting Point: 97°–98°C

Elementary analysis as $C_{13}H_{18}N_2O_2S$:

Calculated: C=58.63 percent, H=6.80 percent, N=10.52 percent, S=12.04 percent.

Found: C=58.44 percent, H=6.88 percent, N=10.36 percent, S=12.01 percent.

8 g of this substance is dissolved in 40 ml of ethanol. 98 percent sulfuric acid is added to the resultant solution until white crystals cease to separate out of the solution. Upon recrystallization from 250 ml of ethanol, 4.5 g of 1-(6-benzothiazolyloxy)-3-isopropylamino-2-propanol sulfate is obtained as white needle crystals.

Melting point: 134°–135°C

Elementary analysis as $C_{13}H_{18}N_2O_2S.1/2H_2SO_4.H_2O$:

Calculated: C=46.83 percent, H=6.35 percent, N=8.40 percent, S=14.42 percent.

Found: C=46.96 percent, H=6.12 percent, N=8.30 percent, S=14.51 percent.

EXAMPLE 6

A mixture of 20 g of 6-hydroxybenzothiazole, 220 g of 3-t-butylamino-1,2-oxypropane, 25 g of potassium carbonate and 200 ml of tetrahydrofuran is refluxed at 75°C for 13 hours on a water bath.

After the reaction, potassium carbonate is removed by filtration and tetrahydrofuran is distilled off. The residual oily product is dissolved in 300 ml of 3N hydrochloric acid. The resultant solution is washed twice with each 100 ml of ether and then adjusted to a pH of 10 with 3N aqueous solution of sodium hydroxide. The liberated oily product is extracted three times with each 100 ml of ethyl acetate. The ethyl acetate extract is dried with sodium sulfate. After ethyl acetate is removed by distillation, 7.5 g of solid is obtained. Upon recrystallization of the solid from a solvent mixture of 20 ml of benzene and 60 ml of ligroin, 6.6 g of 1-(6-benzothiazolyloxy)-3-t-butylamino-2-propanol is obtained.

Melting point: 74°–75°C

Elementary analysis as $C_{14}H_{20}N_2O_2S$:

Calculated: C=59.97 percent, H=7.19 percent, N=9.99 percent, S=11.43 percent.

Found: C=59.95 percent, H=6.96 percent, N=9.97 percent, S=11.42 percent.

4 g of this substance is dissolved in 50 ml of acetone. A solution of 1.7 g of succinic acid in 80 ml of acetone is added to the solution. Upon recrystallization of the crude crystals formed from 50 ml of isopropyl alcohol, 3.8 g of 1-(6-benzothiazolyloxy)-3-t-butylamino-2-propanol succinate is obtained.

Melting point: 145°–147°C, 159°–160°C

Elementary analysis as $C_{14}H_{20}N_2O_2S \cdot 1/2(CH_2COOH)_2$:

Calculated: C=56.62 percent, H=6.83 percent, N=8.25 percent, S=9.45 percent.

Found: C=56.73 percent, H=6.98 percent, N=8.27 percent, S=9.44 percent.

EXAMPLE 7

4 g of 1-(6-benzothiazolyloxy)-3-amino-2-propanol and 20 ml of acetone are refluxed for 20 minutes.

After the reaction, acetone is removed by distillation and the residue is dissolved in 60 ml of methanol. 10 g of sodium borohydride is added little by little to the resultant solution at room temperature. After the addition, the mixture is refluxed at 65°C for 3 hours. The mixture is then cooled and made slightly acidic with 1N hydrochloric acid. Methanol is removed by distillation and the residue is extracted with 60 ml of ethyl acetate. The ethyl acetate extract is dried with sodium sulfate. After ethyl acetate is removed by distillation, 2.3 g of 1-(6-benzothiazolyloxy)-3-isopropylamino-2-propanol is obtained. Upon recrystallization of this substance from a solvent mixture of 20 ml of benzene and 60 ml of ligroin, 1.5 g of crystals are obtained.

Melting point: 97°–98°C

Elementary analysis as $C_{13}H_{18}N_2O_2S$:

Calculated: C=58.63 percent, H=6.80 percent, N=10.52 percent, S=12.04 percent.

Found: C=58.55 percent, H=6.71 percent, N=10.43 percent, S=12.02 percent.

BETA-ADRENERGIC BLOCKING ACTION AND ANTI-ARRHYTHMIC EFFECT OF 1-(6-BENZOTHIAZOLYLOXY)-3-ISOPROPYLAMINO-2-PROPANOL

Beta-adrenergic blocking action of 1-(6-benzothiazolyloxy)-3-isopropylamino-2-propanol, a benzothiazole derivative of the present invention, is studied in guinea pig atria and tracheal muscle. Antiarrhythmic effect on the experimental arrhythmia produced in guinea pig and rat is also examined.

1. Beta-adrenergic blocking action

Effect on chronotropic response to isoproterenol in isolated guinea pig atrial preparation Male guinea pigs weighing from 300 to 500 g are killed by a blow on the head. The heart is quickly removed and freed from connective tissues in Krebs-Ringer's solution oxygenated with 95 percent $O_2$ and 5 percent $CO_2$. Both left and right atria are detached from ventricles. Each end of the atria is ligated with a cotton thread. The preparation is mounted in a 30 ml-organ bath containing oxygenated Krebs-Ringer's solution maintained at 37°C. One end is fixed and the other is connected with a mechano-electric transducer to measure the atrial contractions. The spontaneous heart rate is measured by means of a pulse rate tachometer. These are recorded on an ink-writing oscilloscope.

After an equilibration for one hour, isoproterenol is cumulatively added to the Krebs-Ringer's solution and the dose-heart rate relations of the atrial preparation in response to isoproterenol are examined. The preparation is then washed repeatedly with Krebs-Ringer's solution for 40 minutes. The dose-heart rate relations of the preparation in response to isoproterenol in the presence of $3 \times 10^{-6}M$ 1-(6-benzothiazolyloxy)-3-isopropylamino-2-propanol (monohydrochloride trihydrate) are also examined in the same manner. Likewise, the dose-heart rate relations are examined in the absence and in the presence of $3 \times 10^{-6}M$ 1-(4-methylsulfonylaminophenyl)-2-isoporpylaminoethanol which is well known to have $\beta$-adrenergic blocking activity.

Figure 2:
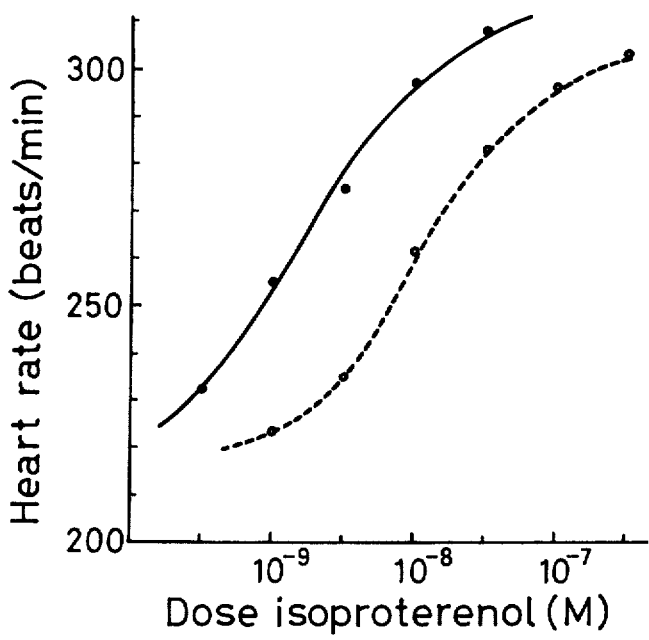

FIGS. 1 and 2 respectively show the influence of 1-(6-benzothiazolyloxy)-3-isopropylamino-2-propanol and that of 1-(4-methylsulfonylaminophenyl)-2-isopropylaminoethanol on chronotropic dose-response curves to isoproterenol in the guinea pig atria. As is apparent from FIG. 1, the dose-response curve shows 10-fold parallel shift to the right in the presence of 1-(6-benzothiazolyloxy)-3-isopropylamino-2-propanol.

Nearly the same extent of parallel shift is observed when 1-(4-methylsulfonylaminophenyl)-2-isopropylaminoethanol is present. The spontaneous heart rate of the guinea pig atria which is normally 220 to 230 beats/min. is increased by the application of isoproterenol. Neither of the test drugs alone affects the spontaneous heart rate of the atria. It can be concluded that 1-(6-benzothiazolyloxy)-3-isopropylamino-2-propanol exerts a competitive and reversible antagonistic action on isoproterenol in the guinea pig atria and that the potency is almost the same as that of 1-(4-methylsulfonylaminophenyl)-2-isopropylaminoethanol.

Effect on inotropic response to isoproterenol in tracheal muscle of guinea pig

Whole tracheal tube is excised from a guinea pig and cut open longitudinally along the anterior side of the trachea. The opened trachea is cut transversely along the ring cartilage into strips of 1.5 to 2 mm in width. Six of these strips are tied up in series to form a chain. The preparation is suspended in an organ bath containing oxygenated Krebs-Ringer's solution maintained at 37°C. One end of the preparation is fixed and the other end is connected with an isotonic ink-writing lever. The tension applied to the preparation is 0.3 g. The contraction and relaxation of the tracheal chain preparation are isotonically recorded on a kymograph.

Isoproterenol is cumulatively applied to the tracheal chain preparation which is previously contacted with $5 \times 10^{-5}M$ histamine. The dose-relaxation relations of the trachea in response to isoproterenol are examined in the absence and in the presence of 1-(6-benzothiazolyloxy)-3-isopropylamino-2-propanol or 1-(4-methylsulfonylaminophenyl)-2-isopropylaminoethanol.

Figure 3:
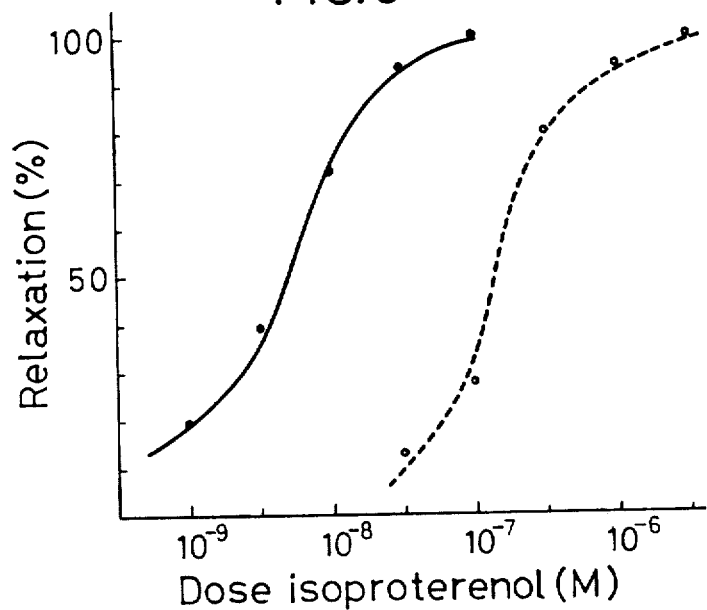
Figure 4:
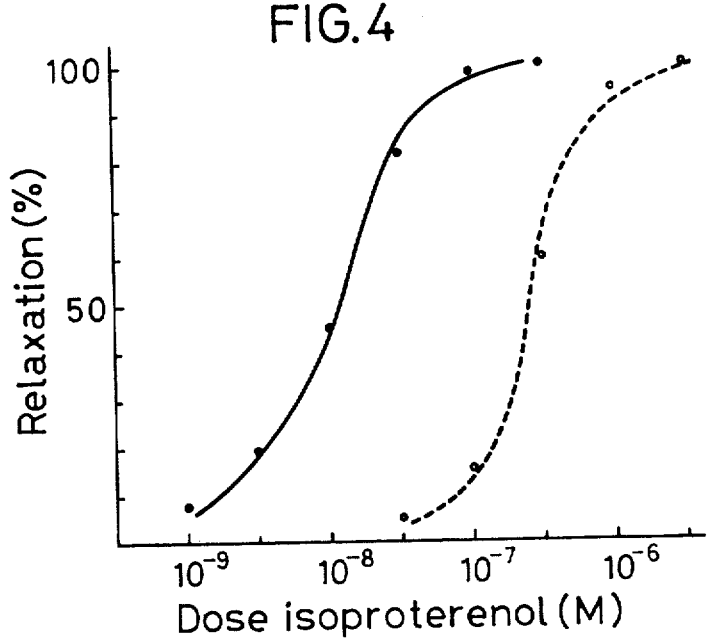

FIGS. 3 and 4 respectively show the influence of 1-(6-benzothiazolyloxy)-3-isopropylamino-2-propanol and that of 1-(4-methylsulfonylaminophenyl)-2-isopropylaminoethanol on inotropic dose-response curves to isoproterenol in the guinea pig tracheal muscle. It is apparent from FIG. 3 that as in the case with the atrial preparation, the test compound exhibits a competitive and reversible β-adrenergic blocking action upon isoproterenol in the tracheal chain preparation. It can be concluded that 1-(6-benzothiazolyloxy)-3-isopropylamino-2-propanol has β-adrenergic blocking activity and that the activity is not significantly different from that of 1-(4-methylsulfonylaminophenyl)-2-isopropylaminoethanol.

II. Anti-arrhythmic effect

Effect on ouabain-induced arrhythmia in guinea pig

Groups of guinea pigs weighing from 350 to 450 g are used. Each guinea pig is anesthetized by intraperitoneal injection of 1.5 g/kg of urethan and is cannulated at trachea. 10 μg/0.75 ml of ouabain is infused into the femoral vein by means of an infusion pump at a rate of 10 μg/3 min. until death. Five minutes before the start of ouabain infusion, the guinea pigs are treated with 1 mg/kg of 1-(6-benzothiazolyloxy)-3-isopropylamino-2-propanol or 1 mg/kg of propranolol by intravenous injection. Each of the test drugs is dissolved in 1 ml/kg of saline solution. As a control, 1 ml/kg of saline solution is intravenously injected to a group of guinea pigs. The electrocardiogram is recorded on an ink-writing oscilloscope through a high gain DC amplifier and the effects of the test drugs on cardiotoxicity of ouabain are studied.

When ouabain is administered to guinea pigs, the first indication of its activity is a decrease in the spontaneous heart rate, followed by a prolongation of the P-R interval (unequal interval). As the administration proceeds, extrasystoles are observed and subsequently, venticular fibrillation and cardiac arrest occur. At each of these successive stages of intoxication, the amount of ouabain administered is checked up. The effects of the test drugs are determined by the amount of ouabain administered.

The results are shown in Table 1 below. It is apparent from the table that 1-(6-benzothiazolyloxy)-3-isopropylamino-2-propanol has an anti-cardiotoxic effect against ouabain which is comparable to that of propranolol.

Table 1 — Continued

| Pretreatment | No. | unequal interval | Fibrillation | cardiac arrest |
|---|---|---|---|---|
| 1-(6-benzo-thiazolyl-oxy)-3-isopropyl-amino-2-propanol (1 mg/kg) | 3 | 111 | 293 | 320 |
| | 4 | 248 | 265 | 319 |
| | 5 | 109 | 274 | 328 |
| | mean | 166 | 286 | 328 |
| Propanolol (1 mg/kg) | 1 | 313 | 417 | 475 |
| | 2 | 196 | 247 | 294 |
| | 3 | 171 | 303 | 342 |
| | 4 | 124 | — | 283 |
| | 5 | 116 | 418 | 490 |
| | 6 | 143 | 233 | 299 |
| | mean | 177 | 324 | 354 |

Effect on CaCl₂-induced arrhythmia in rat

Groups of rats weighing 250 to 400 g are used. Each rat is anesthetized by intraperitoneal injection of 1.5 g/kg of urethan and cannulated at trachea. A solution of 200 mg/ml of $CaCl_2$ in water is infused into the femoral vein by an infusion pump at a rate of 0.25 ml/min. until death. The rats are pretreated with 1 mg/kg or 10 mg/kg of 1-(6-benzothiazolyloxy)-3-isopropylamino-2-propanol or 1 mg/kg or 5 mg/kg of propranolol five minutes before the start of $CaCl_2$ infusion. The drugs are dissolved in 1 ml/kg of saline solution and intravenously injected. As a control, the rats of one group are treated with 1 ml/kg of saline solution.

The effects of the test drugs on cardiotoxic action of $CaCl_2$ are determined by measuring the time (second) from the start of the infusion of $CaCl_2$ until death. The death of rats by the administration of $CaCl_2$ can be attributed to a cardiac arrest. The results are shown in Table 2. From the table, it is apparent that 1-(6-benzothiazolyloxy)-3-isopropylamino-2-propanol has a cardiotoxic effect against $CaCl_2$ and the potency is comparable to that of propranolol.

Table 2

| Pretreatment | | Time of $CaCl_2$ infusion until death (sec.) | | | | | | |
|---|---|---|---|---|---|---|---|---|
| | | No. 1 | 2 | 3 | 4 | 5 | 6 | mean |
| Control (saline) | | 197 | 186 | 145 | 236 | 200 | | 192 |
| 1-(6-benzothiazolyloxy)-3-isopropylamino-2-propanol | (1 mg/kg) | 302 | 240 | 280 | 221 | 212 | | 251 |
| | (10 mg/kg) | 325 | 225 | 168 | 183 | 254 | 280 | 239 |
| Propanolol | (1 mg/kg) | 175 | 260 | 207 | 286 | 195 | | 225 |
| | (5 mg/kg) | 263 | 210 | 154 | 262 | | | 222 |

Table 1

| Pretreatment | No. | unequal interval | Fibrillation | cardiac arrest |
|---|---|---|---|---|
| Control (saline) | 1 | 68 | 152 | 186 |
| | 2 | 66 | 178 | 206 |
| | 3 | 86 | 250 | 301 |
| | 4 | — | 213 | 246 |
| | mean | 78 | 207 | 238 |
| | 1 | 125 | 288 | 338 |
| | 2 | — | 291 | 328 |

What is claimed is:

1. A compound of the formula

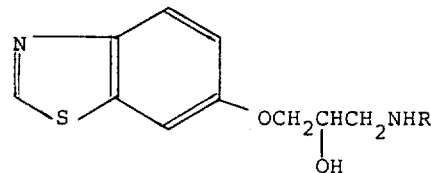

wherein R is a hydrocarbon group selected from the group consisting of alkyl groups having 1 to 5 carbon atoms, aralkyl groups having 7 to 10 carbon atoms and aryl groups having 6 to 10 carbon atoms, and acid addition salts thereof, said acid addition salts being selected from the group consisting of hydrochloride, hydrobromide, phosphate, sulfate, nitrate, oxalate, lactate, tartrate, adipate, acetate, propionate, salicylate, citrate, maleate, naphthoate, succinate and benzoate salts thereof.

2. The compound of claim 1 wherein R is isopropyl.

3. The compound of claim 1 wherein R is phenyl and wherein said compound is in the form of the hydrochloride salt thereof.

4. The compound of claim 1 wherein R is isopropylbenzyl.

5. The compound of claim 1 wherein R is isopropyl and wherein said compound is in the form of the sulfate salt thereof.

6. The compound of claim 1 wherein R is t-butyl.

7. The compound of claim 6, wherein said compound is in the form of the succinate salt thereof.

* * * * *